(12) United States Patent
Marder

(10) Patent No.: US 10,902,264 B2
(45) Date of Patent: Jan. 26, 2021

(54) AUTOMATIC GENERATION OF SECONDARY CLASS ANNOTATIONS

(71) Applicant: International Business Machines Corporation, Armonk, NY (US)

(72) Inventor: Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/199,190

(22) Filed: Nov. 25, 2018

(65) Prior Publication Data

US 2020/0167566 A1 May 28, 2020

(51) Int. Cl.
| | | |
|---|---|---|
| *G06K 9/00* | (2006.01) | |
| *G06N 7/00* | (2006.01) | |
| *G06K 9/32* | (2006.01) | |
| *G06K 9/62* | (2006.01) | |

(52) U.S. Cl.
CPC ....... *G06K 9/00671* (2013.01); *G06K 9/0063* (2013.01); *G06K 9/00208* (2013.01); *G06K 9/3233* (2013.01); *G06K 9/6256* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 9,224,071 B2 | 12/2015 | Tu et al. | |
| 9,767,570 B2 | 9/2017 | Li et al. | |
| 2011/0254950 A1* | 10/2011 | Bibby | G06T 7/149 |
| | | | 348/135 |
| 2013/0039409 A1* | 2/2013 | Gupta | G06T 7/215 |
| | | | 375/240.02 |
| 2016/0265935 A1* | 9/2016 | Ma | G06F 3/167 |
| 2017/0270674 A1 | 9/2017 | Shrivastava | |
| 2018/0232887 A1 | 8/2018 | Lin et al. | |
| 2019/0026558 A1* | 1/2019 | Tanigawa | G06T 15/205 |

\* cited by examiner

*Primary Examiner* — Suhail Khan
(74) *Attorney, Agent, or Firm* — Ziv Glazberg

(57) ABSTRACT

A method, an apparatus and a program for automatic generation of secondary class annotations. The method comprises obtaining a plurality of images of an environment, each of which comprising objects in the environment. Some of the objects are annotated, while other objects are not. The method comprises aligning the plurality of images to a common coordinates system and computing a plurality of weighted images by adding weights to regions in the plurality of images that are associated with annotated objects to reduce significance of such regions. The method further comprises generating, based on the plurality of weighted images, a background model of the environment by determining for each region in the common coordinates system a statistical metric representing a visual feature of a background of the environment. The background model is then utilized to identify the non-annotated objects and adding an annotation for each identified object.

20 Claims, 4 Drawing Sheets

10,902,264 B2

AUTOMATIC GENERATION OF SECONDARY CLASS ANNOTATIONS

TECHNICAL FIELD

The present disclosure relates to automatic image annotation in general, and to automatic secondary class image annotations, in particular.

BACKGROUND

Automatic image annotation may be a process by which a computer system automatically assigns metadata in the form of captioning or keywords to a digital image. Automatic image annotation may be used in image retrieval systems to organize and locate images of interest from a database.

Automatic image annotation may be regarded as a type of multi-class image classification with a large number of classes. Image analysis such as extracting feature vectors and the training annotation words may be used by machine learning techniques to attempt to automatically apply annotations to new images. The first methods learned the correlations between image features and training annotations, then techniques were developed using machine translation to try to translate the textual vocabulary with the clustered regions.

BRIEF SUMMARY

One exemplary embodiment of the disclosed subject matter is a method comprising: obtaining a plurality of images of a same environment, wherein each image of the plurality of images comprises one or more objects in the same environment, wherein a portion of the one or more objects are annotated, wherein at least one non-annotated object is shown in an image of the plurality of images; aligning the plurality of images to a common coordinates system; computing a plurality of weighted images by adding weights to regions in the plurality of images that are associated with the one or more objects that are annotated, whereby reducing significance of the regions representing annotated objects; generating, based on the plurality of weighted images, a background model of the same environment, wherein said generating comprises determining for each region in the common coordinates system a statistical metric representing a visual feature of a background of the same environment; utilizing the background model to identify the at least one non-annotated object; and adding an annotation for each object identified in said utilizing.

Optionally, said obtaining comprises obtaining a training set to be used to train a supervised classifier, wherein the training set comprises the plurality of images and for each image, a set of annotated objects therein.

Optionally, method further comprises: augmenting the training set and training the supervised classifier using an augmented training set, wherein said augmenting comprises said adding the annotation.

Optionally, said utilizing the background model is performed using a machine learning tool that is configured to identify foreground objects in images.

Optionally, said computing comprises utilizing homogenous weights for regions associated with annotated objects.

Optionally, said computing comprises utilizing geometric-based weights, wherein a value of a geometric-based weight for a region is computed using a function that is based on a distance metric of the region from a predetermined reference region.

Optionally, said computing comprises utilizing weights whose value is determined using a function of the annotated object and using an image classifier.

Optionally, the regions are selected from a group consisting of: a pixel and a set of adjacent pixels having a predetermined shape.

Optionally, the statistical metric is selected from a group consisting of: a mean value of a color, a mean value of a texture, a brightness distortion, intensity values, a Gaussian probabilistic density value, and a mixture of Gaussians.

Another exemplary embodiment of the disclosed subject matter is a computerized apparatus having a processor, the processor being adapted to perform the steps of: obtaining a plurality of images of a same environment, wherein each image of the plurality of images comprises one or more objects in the same environment, wherein a portion of the one or more objects are annotated, wherein at least one non-annotated object is shown in an image of the plurality of images; aligning the plurality of images to a common coordinates system; computing a plurality of weighted images by adding weights to regions in the plurality of images that are associated with the one or more objects that are annotated, whereby reducing significance of the regions representing s annotated objects; generating, based on the plurality of weighted images, a background model of the same environment, wherein said generating comprises determining for each region in the common coordinates system a statistical metric representing a visual feature of a background of the same environment; utilizing the background model to identify the at least one non-annotated object; and adding an annotation for each object identified in said utilizing.

Yet another exemplary embodiment of the disclosed subject matter is a computer program product comprising a non-transitory computer readable storage medium retaining program instructions, which program instructions when read by a processor, cause the processor to perform a method comprising: obtaining a plurality of images of a same environment, wherein each image of the plurality of images comprises one or more objects in the same environment, wherein a portion of the one or more objects are annotated, wherein at least one non-annotated object is shown in an image of the plurality of images; aligning the plurality of images to a common coordinates system; computing a plurality of weighted images by adding weights to regions in the plurality of images that are associated with the one or more objects that are annotated, whereby reducing significance of the regions representing annotated objects; generating, based on the plurality of weighted images, a background model of the same environment, wherein said generating comprises determining for each region in the common coordinates system a statistical metric representing a visual feature of a background of the same environment; utilizing the background model to identify the at least one non-annotated object; and adding an annotation for each object identified in said utilizing.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
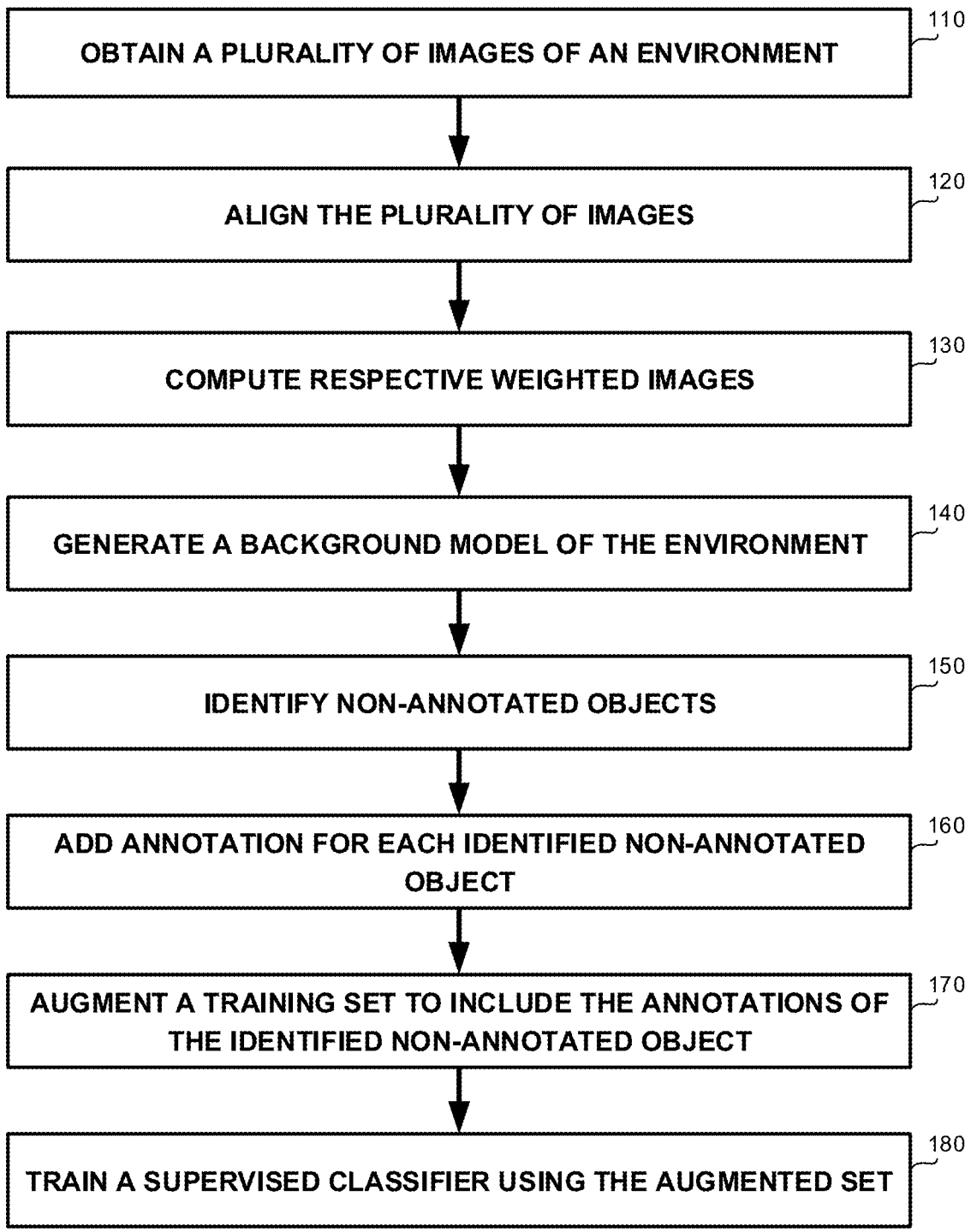
FIG. 1 shows a flowchart diagram of a method, in accordance with some exemplary embodiments of the disclosed subject matter.

One technical problem dealt with by the disclosed subject matter is the problem of modeling the background of images. Foreground detection and background subtraction may be fundamental tasks in the field of computer vision and image processing. In some exemplary embodiments, background subtraction and modeling may be required to allow an image's foreground to be extracted for further processing, such as object recognition, annotations, or the like. Some techniques may be configured to model the background of the image, in order to detect which changes occur. Modeling the background may be very difficult, especially when the image contains shapes, shadows, moving objects, objects similar to the background, or the like. Additionally or alternatively, processed images of a same environment may tend to be very diverse, such as images with very different lighting, interiors, exteriors, quality, or the like.

In some exemplary embodiments, video background modeling and segmentation techniques may be utilized. Such techniques may be configured to generate background models. However, such techniques may rely on the assumption that only foreground objects change or move.

Another technical problem dealt with by the disclosed subject matter is to annotate instances in images, that are not annotated in regular automatic image annotation techniques. In some exemplary embodiments, automatic image annotation techniques may be configured to perform multi-class image classification with a large but limited number of classes. The techniques may involve image analysis in the form of extracted feature vectors and the training annotation words, used by machine learning techniques to attempt to automatically apply annotations to new images. However, such tools may be trained to annotate only known and limited number of objects, such as images previously specified by a user, objects related to the specific environment captured by the images, or the like.

Additionally or alternatively, automatic image annotation techniques may include classification approaches, relevance models, or the like. However, object that are similar to the background, less distinct from the background than other objects, or the like, may not be identified by such techniques. Annotating new objects that may not be annotated by the regular techniques, may make computer vision systems to potentially be more accurate.

One technical solution is to enhance the performance of annotation classifiers. In some exemplary embodiments, annotations determined by existing supervised classifiers may be utilized to identify known objects. Known objects may be eliminated from the images in order to enhance the performance of computer vision techniques for identifying unknown objects.

In some exemplary embodiments, the supervised classifier may be applied on a plurality of images of a same environment. Each image may comprise one or more objects from the same environment. The supervised classifier may be configured to annotates a portion of the one or more objects. However, some objects may remain non-annotated.

In some exemplary embodiments, the plurality of images may differ in their positioning. The differences may be due to movement of the camera, the elapse of time, movement of objects in the captured environments, capturing from different points of view, or the like. The plurality of images may be aligned to a common coordinates system, in order to ascertain which parts of one image correspond to which parts of another image may be required. In some exemplary embodiments, the alignment may be two dimensional or three dimensional. Additionally or alternatively, the alignment may be linear, non-linear, or the like. Different alignments methods may be utilized, such as feature point correspondence, Iterative closest point (ICP), or the like. As an example, points or features in one image may be matched with the corresponding points or features in another image. As another example, ICP algorithms may be employed to minimize the difference between clouds of points from each image.

In some exemplary embodiments, weights may be added to regions in the plurality of images that are associated with the one or more objects that are annotated by the classifier, in order to reduce the significance of the regions representing annotated objects. The regions may be units of the images in the common coordinates system, such as a pixel, a set of adjacent pixels having a predetermined shape (e.g., a rectangle of pixels), a grid, or the like.

In some exemplary embodiments, homogenous weights may be utilized for regions associated with annotated objects. As an example, a zero or a negative value may be assigned as the weight of each pixel comprised by an annotated region. Additionally or alternatively, non-homogenous weights may be utilized for regions associated with annotated objects, such as geometric-based weights, distance-based weights, or the like. as an example, a value of a geometric-based weight for a region may computed using a function that is based on a distance metric of the region from a predetermined reference region, such as the center of the region, boundaries of the region, edge points of the region, or the like.

In some exemplary embodiments, the annotated objects may be marked using rectangles, which may not have the exact shape of the annotated object. As a result, pixels that are not comprised by the annotated object, but are inside the rectangle, may be weighted as an annotated object, and may not be part of the background modeling. In order to achieve a more accurate model, an image classifier may be utilized to determine a shape of the annotated object within the region, such as based on the annotation of the object, or based on other techniques. As an example, if an object is annotated as a plate, the classifier may determine the shape of the object as circular. Computer vision methods may be applied to determine pixels associated with the circle and interior pixels therein, and only such pixels may be weighted as annotated regions. Additionally or alternatively, other techniques may be utilized to determine the shape of the object, such as Hough transform, Machine Learning approach that has been taught to classify shapes, or the like.

In some exemplary embodiments, a background model of the captured environment may be generated based on the plurality of weighted images. The background model may be generated by determining for each region in the common coordinates system, a statistical metric representing a visual feature of the background of the captured environment.

In some exemplary embodiments, the statistical metric may be a mean value of a color of each region, a mean value of a texture of each region, a brightness distortion, intensity values, a Gaussian probabilistic density value, a mixture of Gaussians, a neural network binary classifier, or the like. One method for generating the background model may be a Gaussian model. The method may be model the background at each pixel location with a Gaussian distribution. Additionally or alternatively, a Gaussian Mixture Model (GMM) may be applied. GMM may be configured to model every pixel with a mixture of K Gaussians functions.

In some exemplary embodiments, the background model may be utilized to identify non-annotated object. Machine learning tools may be applied in order to identify foreground objects in images. Additionally or alternatively, pixels, or groups of adjacent pixels, that their delta from the background model is above a predetermined threshold may be determined as non-annotated objects. Each non-annotated region may be classified as a secondary class object region. Each such region of pixels may be clustered using a known pixel clustering method, such as connected component analysis with optional pre or post processing using morphological operations. A more accurate annotation may be determined based on the classification.

In some exemplary embodiments, a training set to be used to train the supervised classifier may be generated/augmented. The training set may comprise the plurality of images and for each image, a set of annotated objects therein. The training set may be augmented by adding each identified non-annotated object to the set of annotated objects in the image.

One technical effect of utilizing the disclosed subject matter is enabling a generic annotation technique. Existing annotation techniques may be configured to perform semantic segmentation. These techniques may be pre-trained for numerous classes. However, such techniques may not be able to annotated new objects that may not belong to any of the classes. In contrast, the method utilized in the disclosed subject matter is generic. The method may be configured to generally annotate identified nom-annotated objects that are not comprised by known classes, as secondary class objects.

Another technical effect of utilizing the disclosed subject matter is to reducing the computer resources utilized for image annotation. The traditional methods of image retrieval and annotation, have relied on manually annotated images, which is expensive and time-consuming, especially given the large and constantly growing image databases in existence. In manual annotation, a human may be taught how to annotate these objects as well as actually perform the annotation. In contrast, the method utilized in the disclosed subject matter relies on partially annotated images, and automatically add annotations to such images. As a result, many objects that only appear sporadically in the data set may be automatically annotated.

As yet Another technical effect of utilizing the disclosed subject matter is to enable additional features for the user of the system to interact with. After automatically creating the secondary objects, a user may be able decide to turn parts of this general class to a specific primary object class, (e.g. all key chains, all mobile phones lying on cafeteria trays, or the like) and augmenting the set of annotations known to the system.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, a plurality of images of a same environment may be obtained. In some exemplary embodiments, each image of the plurality of images may comprise one or more objects in the same environment. In some exemplary embodiments, a portion of the one or more objects may be annotated, while other portion of the one or more objects may be non-annotated. It may be appreciated that at least one non-annotated object is shown in an image of the plurality of images.

In some exemplary embodiments, the plurality of images may be comprised by a training set. The training set may be configured to be utilized to train a supervised classifier. The supervised classifier may be configured to annotate objects in obtained images. The training set may comprise the plurality of images and for each image, a set of annotated objects therein. Additionally or alternatively, a training set may be generated by applying the supervised classifier on the plurality of images.

Additionally or alternatively, the plurality of images may be three-Dimensional (3D) point clouds, the three dimensions of the environment. As an example, the 3D point clouds may generated by multi view, may be obtained by Source FilmMaker (SfM), LiDAR, other 3D capture technologies, or the like.

On Step 120, the plurality of images may be aligned to a common coordinates system. In some exemplary embodiments, the plurality of images may be provided from different inputs, such as from different cameras, different users, different devices, or the like. Additionally or alternatively, the plurality of images may capture the same environment under different conditions, such as from different viewpoints, with different illumination, using different sensors, at different times, or the like. An alignment of the plurality of images to a common coordinates system may be required in order to process the plurality of images as capturing the same environment, to compare or integrate the data obtained from the plurality of images, or the like.

In some exemplary embodiments, a feature-based alignment algorithms may be utilized to perform the alignment. The Alignment may involve spatially transforming some images to align with a target image chosen as a reference frame. Feature-based methods may be configured to find correspondence between image features such as points, lines, contours, or the like. Feature-based methods may be configured to establish s a correspondence between distinct points in images. Knowing the correspondence between these points, a geometrical transformation may be determined to map a target image to the reference images. As a result, point-by-point correspondence between the reference and target images may be established and the plurality of images may be aligned to the common coordinates system.

Additionally or alternatively, intensity-based methods may be utilized to perform the alignment. Intensity-based methods may compare intensity patterns in the plurality of images via correlation metrics. Intensity-based methods may be configured to align entire images or sub-images. Centers of the images or corresponding sub images may be treated as corresponding feature points.

Additionally or alternatively, methods combining intensity-based and feature-based information may be utilized to perform the alignment.

As an example, an Iterative Closest Point (ICP) algorithm may be employed to minimize the difference between the plurality of images. ICP algorithms may also be employed in 3D space images.

On Step 130, a plurality of weighted images may be computed based on the plurality of images. In some exemplary embodiments, weights may be added to regions in the plurality of images that are associated with the one or more objects that are annotated. The weights may be added in a manner reducing significance of the regions representing annotated objects. In some exemplary embodiments, each region may be a pixel, a set of adjacent pixels having a predetermined shape, a combination thereof, or the like. As an example, each image may be divided into grids or segments. Each grid or segment may comprise a predetermined number of pixels, such as 1, 2×2, 5×5, or the like.

In some exemplary embodiments, homogenous weights may be utilized for regions associated with annotated objects. As an example, a zero or a negative value may be assigned to each pixel representing an annotated object, while values of other pixels may be determined based on the colour, texture, or the like.

Additionally or alternatively, complex weights may be utilized for regions associated with annotated objects. In some exemplary embodiments, the complex weights may be geometric-based weights. A value of a geometric-based weight for a region may be computed using a function that is based on a distance metric of the region from a predetermined reference region. The predetermined reference region may be an edge of the annotated object, a boundary of the annotated object, a center point of the annotated object, or the like. Additionally or alternatively, the complex weights may be weights whose values are determined using a function of the annotated object and using an image classifier. The image classifier may be utilized to determine the shape of the annotated object. Accurate boundaries of the object may be calculated, and pixels that are located outside the accurate boundaries may be determined as background. In some exemplary embodiments, the value of pixels outside the boundaries may be determined using a function of the annotated object, such as a function of the shape of the annotated object, a function of the type of the annotated function, distance function from boundaries of the annotated object, or the like.

As an example, in some cases the annotated objects may be provided in a rectangular or a polygon shape, while the shape of the object is different, e.g., a more complicated shape. The image classifier may be utilized to determine the type or the shape of the object, and the boundaries of the annotated object may be updated based on the classification result.

On Step 140, a background model of the same environment may be generated based on the plurality of weighted images. In some exemplary embodiments, the background model may be generated by determining for each region in the common coordinates system, a statistical metric. The statistical metric may be determined based on the plurality of weighted images generated on Step 130, that the annotated objects are reduced therefrom.

In some exemplary embodiments, the statistical metric may be configured to represent a visual feature of the background of the environment. As an example, the statistical metric may be a mean value of the color of the background, a mean value of a texture of the background, or the like. As another example, statistical metric may be a calculated based on the median of the pixel or the group of pixels in each of the plurality of weighted images in a specific location. As yet another example, the statistical metric may be calculated based on a brightness distortion of the background.

Additionally or alternatively, the statistical metric may be calculated by fitting a Gaussian probabilistic density function on the plurality of weighted images in a specific location.

Additionally or alternatively, a mixture of Gaussians method approaches may be utilized as statistical metric. The statistical metric may be calculated by modelling each pixel as a mixture of Gaussians. In this technique, it may be assumed that every pixel's intensity values in the plurality of weighted images can be modeled using a Gaussian mixture model.

On Step 150, the at least one non-annotated object may be identified based on the background model. In some exemplary embodiments, the non-annotated objects may be identified by anomaly detection.

In some exemplary embodiments, a machine learning tool may be utilized to identify non-annotated objects. The machine learning tool may be configured to identify foreground objects in images.

Additionally or alternatively, Intensities that are most probably of the background may be determined. Then the pixels which do not match to these may be determined as the foreground pixels. Foreground pixels may be grouped using 2D connected component analysis and determined as the foreground non-annotated object.

On Step 160, an annotation may be added for each object identified in Step 150.

In some exemplary embodiments, each object identified in Step 150 may be annotated as a secondary object. Additionally or alternatively, a classifier may be utilized to determine a specific annotation of the object, such as based on the shape, the color, or the like.

On Step 170, an augmented training set may be generated. In some exemplary embodiments, the augmented training set may be generated by augmenting the obtained training set, which the plurality of images comprised by. Augmenting the training set may comprise adding the annotations of non-annotated objects, as determined and added on Step 160, to the training set.

On Step 180, the supervised classifier may be trained using the augmented training set. The supervised classifier may be trained to identify, in addition to the already annotated objects, secondary class objects that may have not been identified before.

It may be appreciated that in some exemplary embodiments, the method represented in FIG. 1 may be repeated with synthetic examples. The synthetic examples may be images of the same environment that additional objects may be added thereto. the supervised classifier may be trained to identify the additional objects as foreground objects.

Figure 2A:
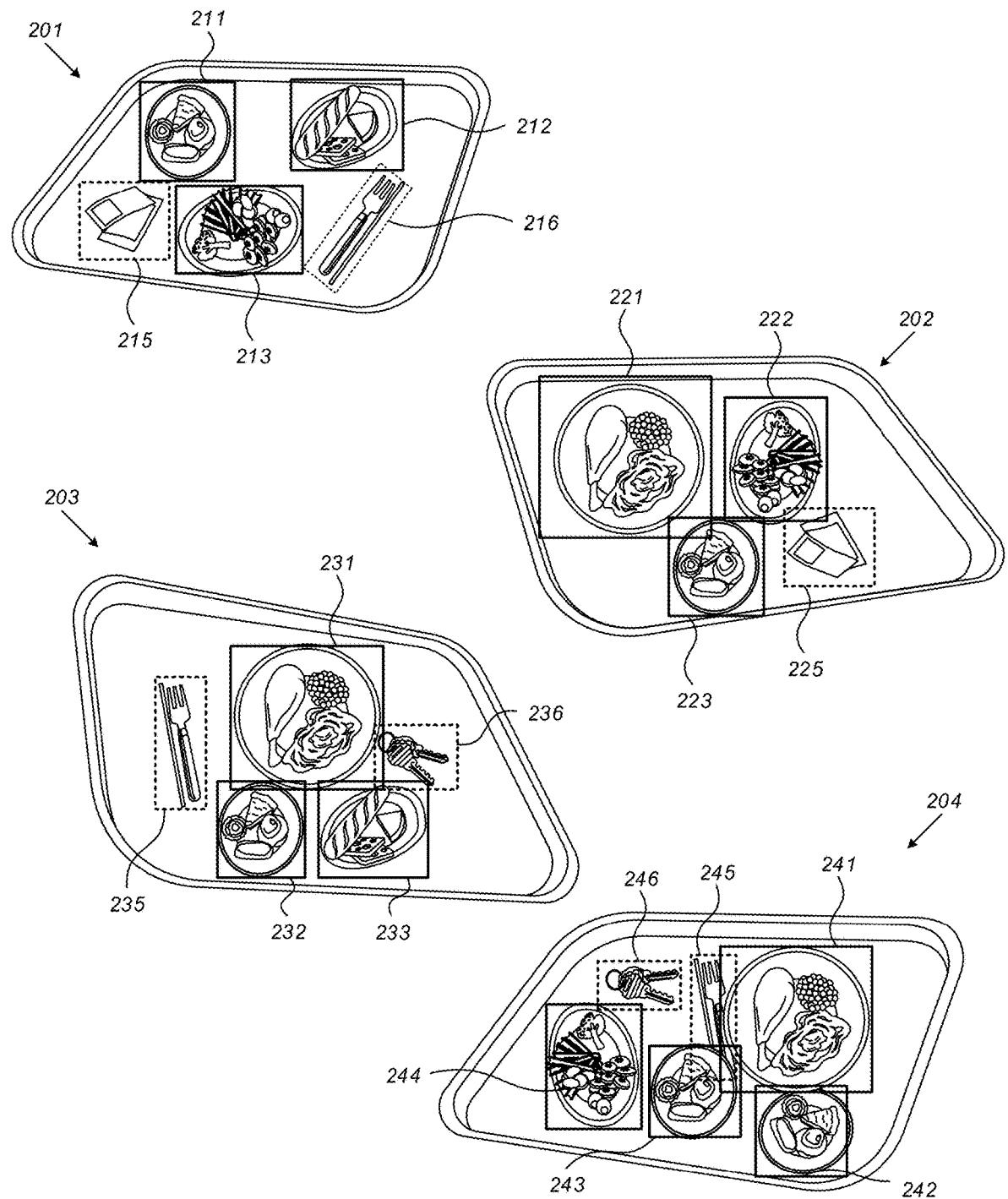
FIGS. 2A-2B show a schematic illustration of an exemplary images, in accordance with some exemplary embodiments of the disclosed subject matter.

Referring now to FIG. 2A showing schematic illustrations of exemplary images, in accordance with some exemplary embodiments of the disclosed subject matter.

In some exemplary embodiments, Images 201, 202, 203 and 204 may be illustrated images of a same environment comprising a tray with objects thereon, such as plates, food items, cups, dishes, cutlery, napkins, keys, mobile phones, or the like. In some exemplary embodiments, some objects in Images 201, 202, 203, 204 may be annotated. As an example, Objects 211, 212 and 213 in Image 201; Objects 221, 222 and 223 in Image 202; Objects 231, 232 and 233 in Image 203; and Objects 241, 242, 243 and 244 in Image 204 may be annotated. The annotated objects may be annotated using a computer vision system, a classifier, or the like.

In some exemplary embodiments, one or more objects, such as Objects 215 and 216 in Image 201; Objects 225 in Image 202; Objects 235 and 236 in Image 203; and Objects 245 and 246 in Image 204 may not be annotated. Such objects may not be annotated because no instructions were given to annotate these. As in manual annotation, in order to reduce the burden on the annotator, instructions for the annotator may be kept as clear as possible. As an example, to annotate only plates of food, to annotate only a limited number of products (e.g. about 200, about 300, or the like), or the like.

Additionally or alternatively, the classifier utilized to perform the annotations may be pre-trained for a limited number of classes, that may be supposed to be relevant to the environment. Such a classifier may not be generic and may be able to annotate only certain objects. As an example, the classifier may be trained to identify objects that are expected to be on the tray, such as plates, but may not be trained to identify keys, such as Object 236 or 246. Additionally or alternatively, the objects may be not annotated due to the computer vision system or the classifier utilized for the annotation being non-accurate, because the objects are too similar to the background, or the like.

In some exemplary embodiments, Images 201, 202, 203 and 204 may be comprised by a training set to be used to train a supervised classifier. The supervised classifier may be trained by the training set, on order to annotate objects in images. The training set may comprise Images 201, 202, 203 and 204 and for each image, a set of annotated objects therein. As an example, the training set may comprise the following pairs: (Images 201, {coordinates and annotation of Object 211, coordinates and annotation of Object 212, coordinates and annotation of Object 213}); (Images 202, {coordinates and annotation of Object 221, coordinates and annotation of Object 222, coordinates and annotation of Object 223}); (Images 203, {coordinates and annotation of Object 231, coordinates and annotation of Object 232, coordinates and annotation of Object 233}); and (Images 204, {coordinates and annotation of Object 241, coordinates and annotation of Object 242, coordinates and annotation of Object 243, coordinates and annotation of Object 244}).

Figure 2B:
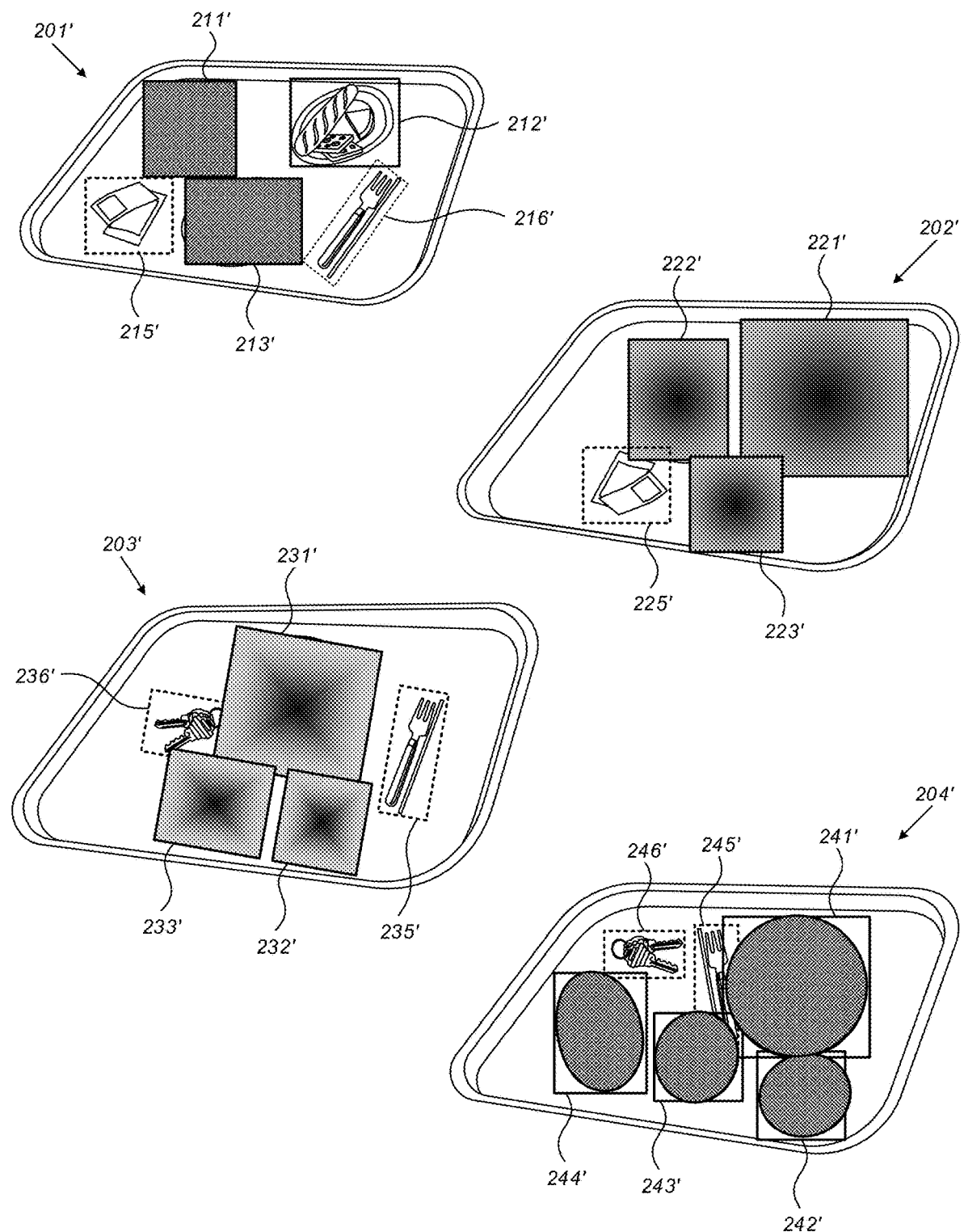

Referring now to FIG. 2B showing schematic illustrations of exemplary images, in accordance with some exemplary embodiments of the disclosed subject matter.

In some exemplary embodiments, Images 201, 202, 203 and 204 of FIG. 2A may be aligned to a common coordinate system. As an example, Images 202 and 203 may be rotated to be in the same coordinate system as Images 201 and 204. As a result, Images 201', 202', 203' and 204' may in the same coordinate system.

In some exemplary embodiments, weights may be added to pixels or grids in Images 201', 202', 203' and 204'. Regions in Images 201', 202', 203' and 204' that are associated with objects that are annotated, may be assigned with lower weights in order to reduce significance of the regions representing annotated objects. As an example, weights of zero or negative value may be assigned to such regions.

In some exemplary embodiments, homogenous weights may be utilized for regions associated with annotated objects. As an example, all pixels of Region 211', Region 212' and Region 213' may be assigned with the same weight.

Additionally or alternatively, geometric-based weights may be utilized for regions associated with annotated objects. In some cases, a value of a geometric-based weight for a region may be computed using a function that is based on a distance metric of the region from a predetermined reference region. As an example, the value of the geometric-based weight for each region may be computed using a distance function from the boundaries of the regions, such as in Region 221', Region 222' and Region 223'. As another example, the value of the geometric-based weight for each region may be computed using a distance function from the center of the regions, such as in Region 231', Region 232' and Region 233'.

Additionally or alternatively, weights whose value is determined using a function of the annotated object and using an image classifier may be utilized. The image classifier may be utilized to determine the exact shape of the annotated object. The boundaries of the objects may be update based on the exact shape instead of a rectangle0 As an example, in Image 204', the classifier may be utilized to determine the shape of the plates, and Regions 241', 242', 243', and 244' may be updated to be circular.

In some exemplary embodiments, a background model of the tray may be generated based on the weights assigned to Images 201', 202', 203' and 204'. Each region (e.g., a pixel, a grid, a group of adjacent pixels, or the like) in the common coordinates system may be assigned with a statistical metric representing a visual feature of a background of tray images. The statistical metric may be a mean value of a color, a mean value of a texture, a brightness distortion, intensity values, a Gaussian probabilistic density value, a mixture of Gaussians, or the like.

In some exemplary embodiments, the background model may be utilized to identify non-annotated objects. As an example, a machine learning tool that is configured to identify foreground objects in images may be applied to identify the non-annotated objects. An annotation of "a secondary class" may be added for each identified non-annotated object, such as Object 215' and Object 216' in Image 201', Object 225' in Image 202', Object 235' and Object 236' in Image 203', and Object 245' and Object 246' in Image 204'.

In some exemplary embodiments, the training set comprising Images 201, 202, 203 and 204 and sets of annotated objects therein may be augmented. The augmentation may be performed by adding the annotation of the identified non-annotated objects as secondary classes. As an example, the augmented training set may comprise the following pairs: (Images 201, {coordinates and annotation of Object 211, coordinates and annotation of Object 212, coordinates and annotation of Object 213, coordinates and annotation (e.g., secondary class) of Object 215', coordinates and annotation (e.g., secondary class) of Object 216'}); (Images 202, {coordinates and annotation of Object 221, coordinates and annotation of Object 222, coordinates and annotation of Object 223, coordinates and annotation (e.g., secondary class) of Object 225'}); (Images 203, {coordinates and annotation of Object 231, coordinates and annotation of Object 232, coordinates and annotation of Object 233} coordinates and annotation (e.g., secondary class) of Object 235', coordinates and annotation (e.g., secondary class) of Object 236'}); and (Images 204, {coordinates and annotation of Object 241, coordinates and annotation of Object 242, coordinates and annotation of Object 243, coordinates and annotation of Object 244, coordinates and annotation (e.g., secondary class) of Object 245', coordinates and annotation (e.g., secondary class) of Object 246'}). The supervised classifier may be trained using the augmented training set.

Figure 3:
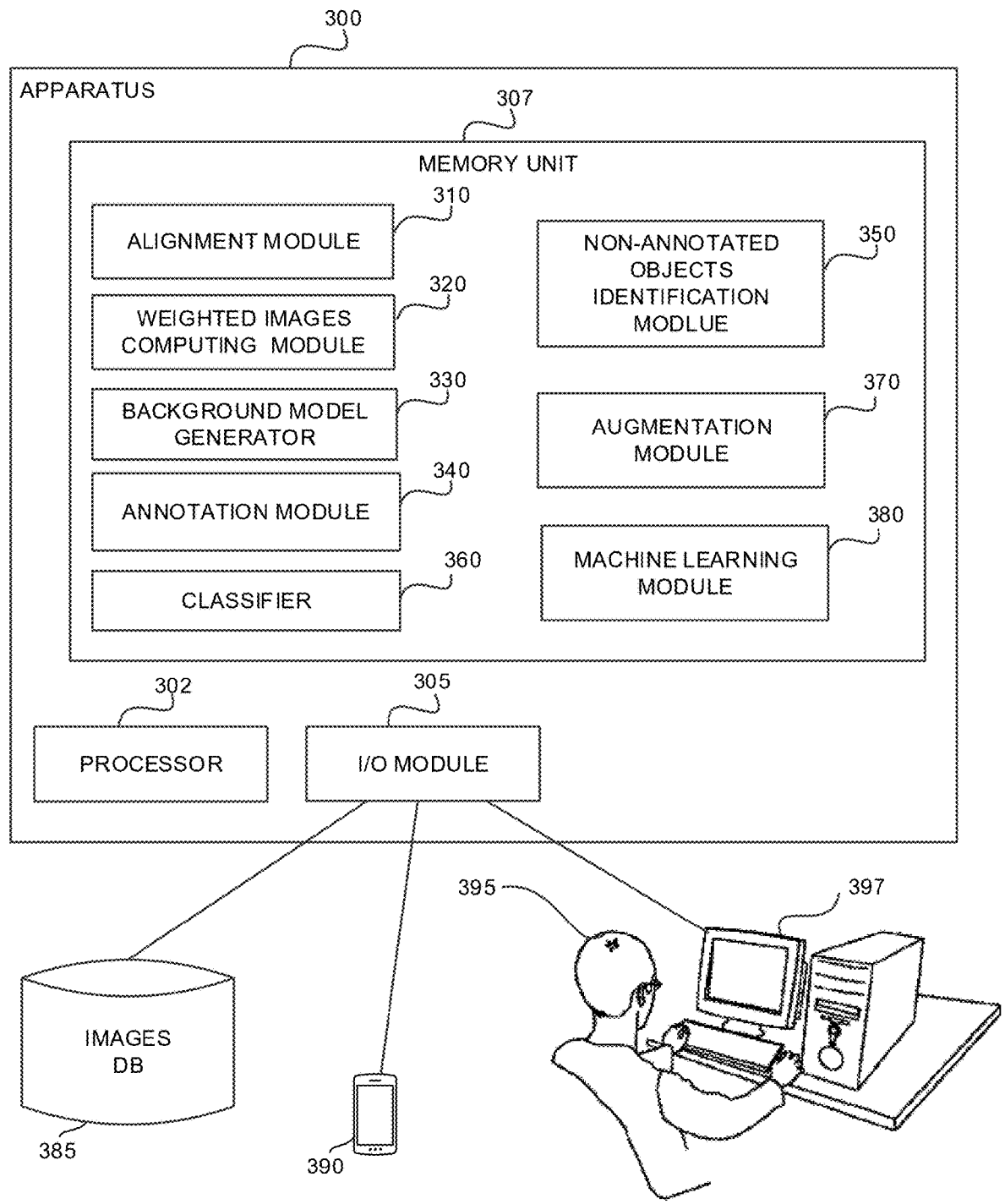
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example obtaining images with one or more annotated objects, providing training sets for classifiers, providing annotations of objects in images, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments I/O module 305 may be configured to obtain a plurality of images of a same environment. The plurality of images may be provided by User 395, from a Computing Device 397, from Images Database 385, from a Mobile Device 390, or the like. Each image of the plurality of images may comprise objects in the same environment. A portion of the objects may be annotated, another portion of the images may be non-annotated, or the like.

In some exemplary embodiments, I/O module 305 may be configured to obtaining a training set to be used to train a Supervised Classifier 360. The training set comprises a plurality of images and for each image, a set of annotated objects therein. In some exemplary embodiments, the plurality of images may comprise additional images that annotations thereof are missing in the respective sets of annotated objects of the additional images. Additionally or alternatively, a training set may be generated by applying Supervised Classifier 360 on the plurality of images. For each image, Supervised Classifier 360 may be configured to output a set of objects identified within the image and annotations thereof.

In some exemplary embodiments, Alignment Module 310 may be configured to align the plurality of images to a common coordinates system. Alignment Module 310 may be configured to utilize alignment methods to align the plurality of images, such as feature point correspondence, ICP in 3D space, or the like.

In some exemplary embodiments, Weighted Images Computing Module 320 may be configured to compute plurality of weighted images based on the plurality of Images obtained by I/O module 305. Weighted Images Computing Module 320 may be configured to add weights to regions in the plurality of images that are associated with objects that are annotated within the obtained images. The generated weighted images may be configured to have reduced significance of the regions representing annotated objects.

In some exemplary embodiments, Background Model Generator 330 may be configured to generate, based on the weighted images generated by Weighted Images Computing Module 320, a background model of the same environment. Background Model Generator 330 may be configured to determine for each region in the common coordinates system determined by Alignment Module 310, a statistical metric representing a visual feature of a background of the environment represented by the plurality of images.

In some exemplary embodiments, Background Model Generator 330 may be configured to utilize homogenous weights for regions associated with annotated objects, complex weights, combination thereof, or the like. Background Model Generator 330 may be configured to utilize geometric-based weights. Background Model Generator 330 may be configured to compute values of the geometric-based weight for a region using a function that is based on a distance metric of the region from a predetermined reference region, using a function of the annotated object, using an image classifier, or the like.

In some exemplary embodiments, Background Model Generator 330 may be configured to calculate the statistical metric based on a mean value of a color of the background, a mean value of a texture of the background, a brightness distortion of the background, intensity values, a Gaussian mixture model, or the like.

In some exemplary embodiments, Non-Annotated Objects Identification Module 350 may be configured to utilize the background model generated by Background Model Generator 330 to identify non-annotated objects in the weighted images. Non-Annotated Objects Identification Module 350 may be configured to perform foreground detection in accordance with the background model generated by Background Model Generator 330. As an example, Non-Annotated Objects Identification Module 350 may be configured to apply anomaly detection techniques in order to extract non-annotated objects from the weighted images. Additionally or alternatively, Non-Annotated Objects Identification Module 350 may be configured to utilize Machine Learning Module 380 that may be configured to identify foreground objects in images.

In some exemplary embodiments, Annotation Module 340 may be configured to add an annotation for each object identified by Non-Annotated Objects Identification Module 350. Annotation Module 340 may be configured to annotate each identified object as a secondary class object. Additionally or alternatively, a more accurate annotation may be determined, such as using machine learning tools, comparing with known objects, or the like.

In some exemplary embodiments, Augmentation Module 370 may be configured to augment the training set. Augmentation Module 370 may be configured to augment the training set by adding objects identified by Non-Annotated Objects Identification Module 350, and the annotations thereof as determined Annotation Module 340.

In some exemplary embodiments, Machine Learning Module 380 may be configured to train Supervised Classifier 360 using the augmented training set generated by Augmentation Module 370.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a plurality of images of a same environment, wherein each image of the plurality of images comprises one or more objects in the same environment, wherein a portion of the one or more objects are annotated, wherein at least one non-annotated object is shown in an image of the plurality of images;
aligning the plurality of images to a common coordinates system;
computing a plurality of weighted images by adding weights to regions in the plurality of images that are associated with the one or more objects that are annotated, whereby reducing significance of the regions representing annotated objects;
generating, based on the plurality of weighted images, a background model of the same environment, wherein said generating comprises determining for each region in the common coordinates system a statistical metric representing a visual feature of a background of the same environment, wherein the statistical metric is determined based on the plurality of weighted images;
utilizing the background model to identify the at least one non-annotated object; and
adding an annotation for each object identified in said utilizing.

2. The method of claim 1,
wherein said obtaining comprises obtaining a training set to be used to train a supervised classifier, wherein the training set comprises the plurality of images and for each image, a set of annotated objects therein;
the method further comprises: augmenting the training set and training the supervised classifier using an augmented training set, wherein said augmenting comprises said adding the annotation.

3. The method of claim 2, wherein said utilizing the background model is performed using a machine learning tool that is configured to identify foreground objects in images.

4. The method of claim 1, wherein said computing comprises utilizing homogenous weights for regions associated with annotated objects.

5. The method of claim 1, wherein said computing comprises utilizing geometric-based weights, wherein a value of a geometric-based weight for a region is computed using a function that is based on a distance metric of the region from a predetermined reference region.

6. The method of claim 1, wherein said computing comprises utilizing weights whose value is determined using a function of the annotated object and using an image classifier.

7. The method of claim 1, wherein the regions are selected from a group consisting of: a pixel and a set of adjacent pixels having a predetermined shape.

8. The method of claim 1, wherein the statistical metric is selected from a group consisting of: a mean value of a color, a mean value of a texture, a brightness distortion, intensity values, a Gaussian probabilistic density value, and a mixture of Gaussians.

9. A computerized apparatus having a processor, the processor being adapted to perform the steps of:
obtaining a plurality of images of a same environment, wherein each image of the plurality of images comprises one or more objects in the same environment, wherein a portion of the one or more objects are annotated, wherein at least one non-annotated object is shown in an image of the plurality of images;
aligning the plurality of images to a common coordinates system;
computing a plurality of weighted images by adding weights to regions in the plurality of images that are associated with the one or more objects that are annotated, whereby reducing significance of the regions representing annotated objects;
generating, based on the plurality of weighted images, a background model of the same environment, wherein said generating comprises determining for each region in the common coordinates system a statistical metric representing a visual feature of a background of the same environment, wherein the statistical metric is determined based on the plurality of weighted images;
utilizing the background model to identify the at least one non-annotated object; and
adding an annotation for each object identified in said utilizing.

10. The computerized apparatus of claim 9,
wherein said obtaining comprises obtaining a training set to be used to train a supervised classifier, wherein the training set comprises the plurality of images and for each image, a set of annotated objects therein;
wherein the processor is further adapted to perform: augmenting the training set and training the supervised classifier using an augmented training set, wherein said augmenting comprises said adding the annotation.

11. The computerized apparatus of claim 10, wherein said utilizing the background model is performed using a machine learning tool that is configured to identify foreground objects in images.

12. The computerized apparatus of claim 9, wherein said computing comprises utilizing homogenous weights for regions associated with annotated objects.

13. The computerized apparatus of claim 9, wherein said computing comprises utilizing geometric-based weights, wherein a value of a geometric-based weight for a region is computed using a function that is based on a distance metric of the region from a predetermined reference region.

14. The computerized apparatus of claim 9, wherein said computing comprises utilizing weights whose value is determined using a function of the annotated object and using an image classifier.

15. The computerized apparatus of claim 9, wherein the regions are selected from a group consisting of: a pixel and a set of adjacent pixels having a predetermined shape.

16. The computerized apparatus of claim 9, wherein the statistical metric is selected from a group consisting of: a mean value of a color, a mean value of a texture, a brightness distortion, intensity values, a Gaussian probabilistic density value, and a mixture of Gaussians.

17. A computer program product comprising a non-transitory computer readable storage medium retaining program instructions, which program instructions when read by a processor, cause the processor to perform a method comprising:

obtaining a plurality of images of a same environment, wherein each image of the plurality of images comprises one or more objects in the same environment, wherein a portion of the one or more objects are annotated, wherein at least one non-annotated object is shown in an image of the plurality of images;

aligning the plurality of images to a common coordinates system;

computing a plurality of weighted images by adding weights to regions in the plurality of images that are associated with the one or more objects that are annotated, whereby reducing significance of the regions representing annotated objects;

generating, based on the plurality of weighted images, a background model of the same environment, wherein said generating comprises determining for each region in the common coordinates system a statistical metric representing a visual feature of a background of the same environment, wherein the statistical metric is determined based on the plurality of weighted images;

utilizing the background model to identify the at least one non-annotated object; and adding an annotation for each object identified in said utilizing.

18. The method of claim 1, wherein said computing comprises utilizing non-homogenous weights for regions associated with annotated objects.

19. The method of claim 1,
wherein said computing the plurality of weighted images comprises:
identifying at least one image of the plurality of images showing an annotated object, wherein the annotated object having a non-rectangular shape;
determining an exact region associated with the annotated object, wherein the exact region is determined based on exact boundaries of the annotated object, whereby determining a non-rectangular region.

20. The method of claim 19,
wherein said computing the plurality of weighted images further comprises:
adding non-homogenous weights to regions in the plurality of images that are associated with the one or more objects that are annotated, wherein a weight added to the non-rectangular region is different than weights added to rectangular regions.

* * * * *